US011812002B2

(12) United States Patent
Liu et al.

(10) Patent No.: US 11,812,002 B2
(45) Date of Patent: Nov. 7, 2023

(54) METHOD AND DEVICE FOR CORRECTING A SCANNED IMAGE AND IMAGE SCANNING SYSTEM (71) Applicant: NUCTECH COMPANY LIMITED, Beijing (CN)

(72) Inventors: Bicheng Liu, Beijing (CN); Hao Yu, Beijing (CN); Weizhen Wang, Beijing (CN); Guangming Xu, Beijing (CN); Haojie Chi, Beijing (CN); Shangmin Sun, Beijing (CN); Chunguang Zong, Beijing (CN); Yu Hu, Beijing (CN)

(*) Notice: Subject to any disclaimer, the term of this patent is extended or adjusted under 35 U.S.C. 154(b) by 163 days.

(21) Appl. No.: 17/382,236

(22) Filed: Jul. 21, 2021

(65) Prior Publication Data
US 2022/0030132 A1 Jan. 27, 2022

(30) Foreign Application Priority Data
Jul. 22, 2020 (CN) .......................... 202010711447.5

(51) Int. Cl.
H04N 1/409 (2006.01)
G06T 7/00 (2017.01)
(Continued)

(52) U.S. Cl.
CPC ......... H04N 1/4092 (2013.01); G06T 3/4007 (2013.01); G06T 5/006 (2013.01);
(Continued)

(58) Field of Classification Search
CPC ............. H04N 1/4092; H04N 1/00005; H04N 1/00037; G06T 3/4007; G06T 5/006;
(Continued)

(56) References Cited

U.S. PATENT DOCUMENTS

| 6,606,421 B1* | 8/2003 | Shaked ............ G06K 19/06037 382/275 |
| 11,288,789 B1* | 3/2022 | Chen ....................... G06T 7/001 |
| 11,398,084 B2* | 7/2022 | Che ........................ H04N 23/60 |
| 2016/0189352 A1 | 6/2016 | Slutsky |

(Continued)

FOREIGN PATENT DOCUMENTS

| CN | 101170627 A | 4/2008 |
| CN | 102194215 A | 9/2011 |

(Continued)

OTHER PUBLICATIONS

ERDAS Image Processing Basic Experimental Tutorial.
First OA received in CN Application No. 202010711447.5; dated Aug. 23, 2023.

Primary Examiner — Edward F Urban
Assistant Examiner — Benedict E Lee
(74) Attorney, Agent, or Firm — KILPATRICK TOWNSEND & STOCKTON, LLP (57) ABSTRACT The present disclosure provides a method and device for correcting a scanned image, and an image scanning system, and relates to the field of image scanning. The method includes obtaining a scanned image of a scanned object, detecting one or more reference objects from the scanned image, determining a deformation parameter of each reference object of the one or more reference objects based on preset a standard parameter of the each reference object, and correcting the scanned image based on the deformation parameters of the one or more reference objects.

16 Claims, 5 Drawing Sheets (51) Int. Cl.
*G06T 3/40* (2006.01)
*G06T 5/00* (2006.01)
*G06T 5/50* (2006.01)
*H04N 1/00* (2006.01)

(52) U.S. Cl.
CPC .................. *G06T 5/50* (2013.01); *G06T 7/97* (2017.01); *H04N 1/00005* (2013.01); *H04N 1/00037* (2013.01); *G06T 2207/10008* (2013.01); *G06T 2207/20021* (2013.01)

(58) Field of Classification Search
CPC ... G06T 5/50; G06T 7/97; G06T 2207/10008; G06T 2207/20021; G06T 2207/20081; G06T 2207/20084; G06T 3/0093; G06T 2207/30252; G06T 7/55; G06V 10/247; G06V 10/255; G06V 10/82
See application file for complete search history.

(56) References Cited

U.S. PATENT DOCUMENTS

| | | | |
|---|---|---|---|
| 2019/0057505 A1* | 2/2019 | Pheiffer | G06T 7/0016 |
| 2019/0057525 A1* | 2/2019 | Masumoto | A61B 5/055 |
| 2020/0000425 A1* | 1/2020 | Ji | A61B 6/488 |
| 2020/0041619 A1 | 2/2020 | Maheshwari et al. | |
| 2020/0134366 A1* | 4/2020 | Xu | G06V 10/82 |
| 2020/0348140 A1* | 11/2020 | Doemling | G01C 21/3867 |
| 2020/0364864 A1* | 11/2020 | Shanbhag | G06T 11/008 |
| 2021/0004951 A1* | 1/2021 | Iwai | G06T 7/0002 |
| 2021/0322112 A1* | 10/2021 | Junio | A61B 34/25 |

FOREIGN PATENT DOCUMENTS

| | | |
|---|---|---|
| CN | 108492246 A | 9/2018 |
| CN | 109145927 A | 1/2019 |
| EP | 2941727 B1 | 12/2019 |
| GB | 2559639 A | 8/2018 |

* cited by examiner

METHOD AND DEVICE FOR CORRECTING A SCANNED IMAGE AND IMAGE SCANNING SYSTEM

CROSS-REFERENCES TO RELATED APPLICATIONS

The present disclosure is based on and claims priority of Chinese application for invention No. 202010711447.5, filed on Jul. 22, 2020, the disclosure of which is hereby incorporated into this disclosure by reference in its entirety.

FIELD

The present disclosure relates to the field of image scanning, and in particular to a method and device for correcting a scanned image, and an image scanning system.

BACKGROUND

The image scanning system emits rays to a scanned object to form a radiation image to realize the detection of the scanned object.

SUMMARY

In some embodiments of the present disclosure, a method for correcting a scanned image is provided. The method includes: obtaining a scanned image of a scanned object; detecting one or more reference objects from the scanned image; determining a deformation parameter of each reference object of the one or more reference objects based on preset a standard parameter of the each reference object; and correcting the scanned image based on the deformation parameters of the one or more reference objects.

In some embodiments, the correcting the scanned image includes: in response that reference objects are detected from the scanned image and the plurality of reference objects have different deformation parameters, correcting images of different parts of the scanned image respectively based on the deformation parameter of each reference object; or in response that reference objects are detected from the scanned image and the plurality of reference objects have the same deformation parameter, correcting the entire scanned image based on the same deformation parameter; or in response that one reference object is detected from the scanned image, correcting the entire scanned image based on the deformation parameter of the one reference object.

In some embodiments, in response that reference objects are detected from the scanned image and the plurality of reference objects have different deformation parameters, correcting images of different parts of the scanned image respectively based on the deformation parameter of each reference object includes: dividing the scanned image into parts with the same number of the reference objects and dividing different reference objects at different parts of the scanned image based on positions and the number of the reference objects; and correcting the image of the part where each reference object is situated in the scanned image respectively based on the deformation parameter of the corresponding reference object.

In some embodiments, in response that reference objects are detected from the scanned image and the plurality of reference objects have different deformation parameters, correcting images of different parts of the scanned image respectively based on the deformation parameter of each reference object includes: providing one or more transition areas between two adjacent reference objects in the scanned image, and deformation parameter of each transition area is determined based on the deformation parameters of the two adjacent reference objects; dividing the scanned image into parts where each reference object is situated and one or more transition areas between the two adjacent reference objects; correcting the image of the part where each reference object is situated in the scanned image respectively based on the deformation parameter of the corresponding reference object; and correcting the image of each transition area respectively based on the deformation parameter of the corresponding transition area.

In some embodiments, the deformation parameter of each transition area between the two adjacent reference objects are obtained by weighted summing the deformation parameters of the two adjacent reference objects according to the corresponding weighting factors, and the more proximate to the transition area, the greater weighting factor of the reference object.

In some embodiments, the detecting one or more reference objects from the scanned image includes: using the reference object as a target to be detected, and detecting one or more reference objects from the scanned image by using a target detection model.

In some embodiments, the target detection model includes: Region-based Convolutional Neural Networks (R-CNN) model, You only look once (YOLO) model, Single Shot MultiBox Detector (SSD), Weakly supervised object detection (WSOD) model, or a combination of Histogram of Oriented Gradient (HOG) and Support Vector Machine (SVM).

In some embodiments, the correcting the scanned image includes: if the deformation parameter indicate that an image to be corrected is stretched in the vertical direction, performing, on the image to be corrected, at least one of the pixel interpolation processing in horizontal direction or the pixel sampling processing in vertical direction with a correction degree corresponding to a degree of stretching in the vertical direction; or if the deformation parameter indicate that an image to be corrected is stretched in the horizontal direction, performing, on the image to be corrected, at least one of the pixel sampling processing in horizontal direction or the pixel interpolation processing in vertical direction with a correction degree corresponding to a degree of stretching in the horizontal direction; and the image to be corrected is the entire scanned image or any one of images of different parts of the scanned image.

In some embodiments, the reference object is a part of a known shape or a known dimensional ratio of the scanned object.

In some embodiments, in response that the scanned object is a vehicle, the reference object is a round wheel of the vehicle; or, in response that the scanned object is a container, the reference object is a detection surface with a known ratio of length to width of the container.

In some embodiments, the scanned image is a backscatter image or a transmission image.

In some embodiments of the present disclosure, a device for correcting a scanned image is provided. The device includes: a memory; and a processor coupled to the memory, and the processor is configured to run instructions stored in the memory to implement the method for correcting a scanned image according to any one of the embodiments.

In some embodiments of the present disclosure, a device for correcting a scanned image is provided. The device includes: an image obtaining device configured to obtain a scanned image of a scanned object; a target detection device configured to detect one or more reference objects from the scanned image; a parameter determining device configured to determine a deformation parameter of each reference object of the one or more reference objects based on preset a standard parameter of the each reference object; and an image correction device configured to correct the scanned image based on the deformation parameters of the one or more reference objects.

In some embodiments of the present disclosure, an image scanning system is provided. The system includes: an image scanning device configured to scan a scanned object to form a scanned image of the scanned object; and the device for correcting a scanned image according to the foregoing embodiments.

In some embodiments, the image scanning device is a backscatter image scanning device or a transmission image scanning device.

In some embodiments of the present disclosure, a non-transitory computer-readable storage medium storing computer programs is provided. The computer programs when executed by a processor, implement the method for correcting a scanned image according to any one of the embodiments.

BRIEF DESCRIPTION OF THE DRAWINGS

A brief introduction will be given below for the accompanying drawings required for use in the description of the embodiments or the relevant art.

The present disclosure will be more clearly understood according to the following detailed description with reference to the accompanying drawings.

It is obvious that, the accompanying drawings described below are merely some of the embodiments of the present disclosure. Other accompanying drawings may also be obtained according to such accompanying drawings on the premise that no inventive effort is involved.

DETAILED DESCRIPTION OF THE DISCLOSURE

The inventors have found that, in response that the relative movement speed between the image scanning system and the scanned object does not match the scanning parameters of the image scanning system (for example, the beam exiting frequency of the radiation source or the number of rotations of the flywheel, or the like), the scanned image may be deformed, affecting the detection effect.

One problem to be solved by the embodiments of the present disclosure is the problem that the scanned image is deformed due to the fact that the relative movement speed between the image scanning system and the scanned object does not match the scanning parameters of the image scanning system.

In the embodiments of the present disclosure, a reference object is detected from the scanned image, and the scanned image is corrected according to the deformation parameter of the reference object, to improve the problem of the deformation of the scanned image and improve the detection effect.

The embodiments of the present disclosure will be explicitly and completely described below in conjunction with the accompanying drawings in the embodiments of the present disclosure.

Figure 1:
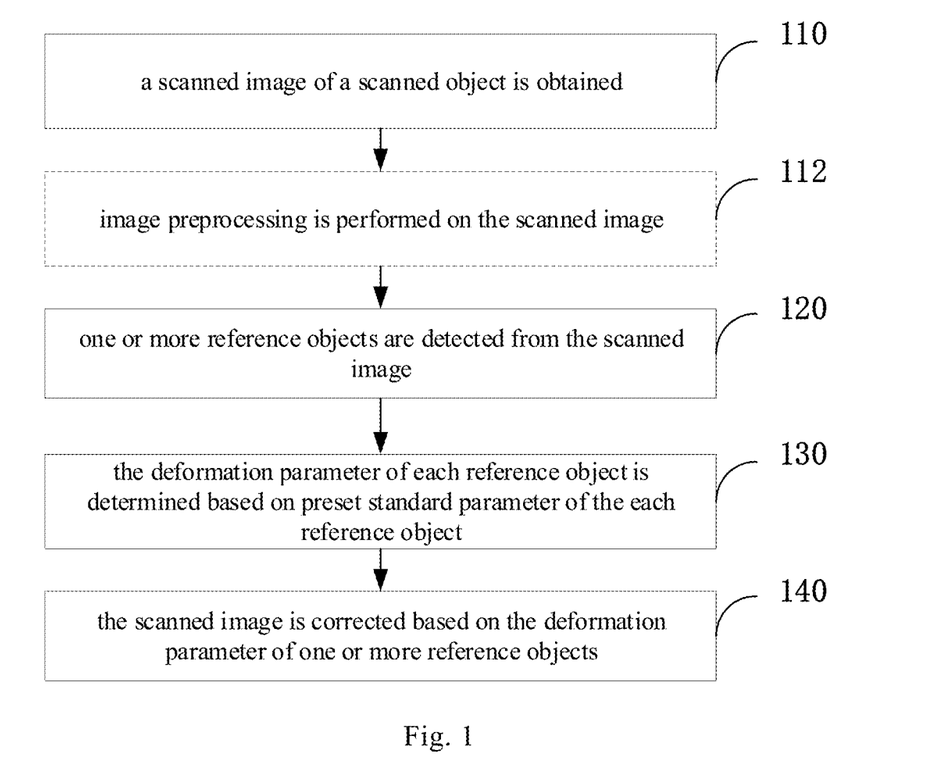
FIG. 1 shows a schematic flowchart of a method for correcting a scanned image according to some embodiments of the present disclosure.

FIG. 1 shows a schematic flowchart of a method for correcting a scanned image according to some embodiments of the present disclosure. This method may be executed by, for example, a device for correcting a scanned image.

As shown in FIG. 1, the method of this embodiment includes steps 110-140.

In step 110, a scanned image of a scanned object is obtained.

The scanned object is, for example, a vehicle, a container, a person, or the like, but not limited to the examples as listed.

The device for correcting a scanned image may, for example, obtain a scanned image of the scanned object from an image scanning device. According to different imaging principles, the image scanning device is divided into a backscatter image scanning device and a transmission image scanning device. Correspondingly, the scanned image of the scanned object is divided into a backscatter image or a transmission image. The backscatter image is that the backscatter image scanning device forms an image by capturing incident photons scattered back by the scanned object by using the Compton scattering effect. The transmission image is that the transmission image scanning device forms an image by detecting the incident rays that are attenuated after transmission through the scanned object by using the detector located on the other side of the scanned object.

Both the backscatter image scanning device and the transmission image scanning device have two scanning modes, namely an active scanning mode and a passive scanning mode. In the active scanning mode, the scanned object does not move, and the image scanning device moves. In the passive scanning mode, the image scanning device does not move, and the scanned object moves. The passive scanning mode is also referred to as a fast scanning mode. In either the active scanning mode or the passive scanning mode, during the relative displacement between the image scanning device and the scanned object, the image scanning device emits radiation, such as X-rays or gamma rays, to image the scanned object.

After step 110 and before step 120, step 112 may be alternatively performed, that is, image preprocessing is performed on the scanned image.

The image preprocessing includes, for example, processing such as effective area clipping, image size adjustment, image brightness and contrast adjustment, image enhancement, and image noise reduction, but it is not limited to the examples as listed.

By way of image preprocessing, a relatively standardized scanned image to be processed may be obtained, improving the accuracy and speed of detecting the reference object from the scanned image.

In step 120, one or more reference objects are detected from the scanned image.

The reference object is a part of a known shape or a known dimensional ratio of the scanned object. For example, in response that the scanned object is a vehicle, the reference object may be a round wheel (for example, a tire or a wheel hub) of the vehicle. For another example, in response that the scanned object is a container, the reference object is a detection surface with a known dimensional ratio of length and width of the container. In one embodiment, a vehicle has wheels. Therefore, wheel-reference objects may be detected from the scanned image of the vehicle. One detection surface reference object may be detected from the scanned image of the container.

The reference object is used as a target to be detected, and one or more reference objects are detected from the scanned image by using a target detection model. That is, the scanned image is input to the target detection model, and the target detection model outputs one or more reference objects of the scanned image.

The target detection model includes, for example: R-CNN (Region-based Convolutional Neural Networks) model, YOLO (You only look once) model, SSD (Single Shot MultiBox Detector), WSOD (Weakly supervised object detection) model, or a combination of HOG (Histogram of Oriented Gradient) and SVM (Support Vector Machine), and other machine learning models achieve the target detection, but is not limited to the examples as listed. Depending on different target detection models, the reference object as the target detection result of the target detection model may be output for example by drawing a rectangular frame, depicting a boundary of the reference object and outputting a position of a feature point of the reference object, but is not limited to the examples as listed.

The target detection model may be, for example, an unsupervised, weakly supervised or supervised model. For example, the combination of HOG and SVM is an unsupervised model, WSOD model is a weakly supervised model, and R-CNN, YOLO model, SSD and the like are supervised models.

The target detection models as listed above are all relatively mature technologies, and thus will not be described in detail here. The detection of a reference object will be illustrated below with deep learning-based target detection models such as R-CNN, YOLO and SSD as examples. By way of inputting training images labeled with the reference object to a deep learning model such as R-CNN, YOLO and SSD, and the parameters of the deep learning model are iteratively updated based on a gap between the reference object output by the deep learning model and the labeled reference object, until the training termination conditions are achieved. For example, the gap between the reference object output by the deep learning model and the labeled reference object is smaller than a preset gap, or the preset number of iterations is reached. The trained deep learning model may be used as a target detection model of the reference object. In the target detection stage, the scanned image is input to the target detection model, and the target detection model outputs one or more reference objects of the scanned image.

In step 130, the deformation parameter of each reference object is determined based on preset standard parameter of the each reference object.

In step 140, the scanned image is corrected based on the deformation parameter of one or more reference objects.

By detecting a reference object from the scanned image, the scanned image is corrected based on the deformation parameter of the reference object, to improve the problem of the deformation of the scanned image and improve the detection effect.

Correction method 1: in response that one reference object is detected from the scanned image, the entire scanned image is corrected based on the deformation parameter of the reference object.

Correction method 2: in response that reference objects are detected from the scanned image and the plurality of reference objects have the same deformation parameter, the entire scanned image is corrected based on the same deformation parameter.

Correction method 3: in response that reference objects are detected from the scanned image and the plurality of reference objects have different deformation parameter, the images of different parts of the scanned image are respectively corrected based on the deformation parameter of each reference object.

The image correction technology involved in the above-described correction methods 1-3 may use, for example pixel interpolation processing for enlarging an image or pixel sampling processing for reducing an image, but is not limited to the examples as listed. In one embodiment, if the deformation parameter indicate that the image to be corrected is stretched in the vertical direction, the image to be corrected is performed at least one of the pixel interpolation processing in horizontal direction with a correction degree (for example, enlargement factor) or the pixel sampling processing in vertical direction with a correction degree (for example, reduction factor) corresponding to a degree of stretching in the vertical direction, if the deformation parameter indicate that the image to be corrected is stretched in the horizontal direction, the image to be corrected is performed at least one of the pixel sampling processing in horizontal direction with a correction degree (for example, reduction factor) or the pixel interpolation processing in vertical direction with a correction degree (for example, enlargement factor) corresponding to a degree of stretching in the horizontal direction, and the image to be corrected is the entire scanned image or any one of images of different parts of the scanned image as mentioned in the correction methods 1-3.

Figure 2A:
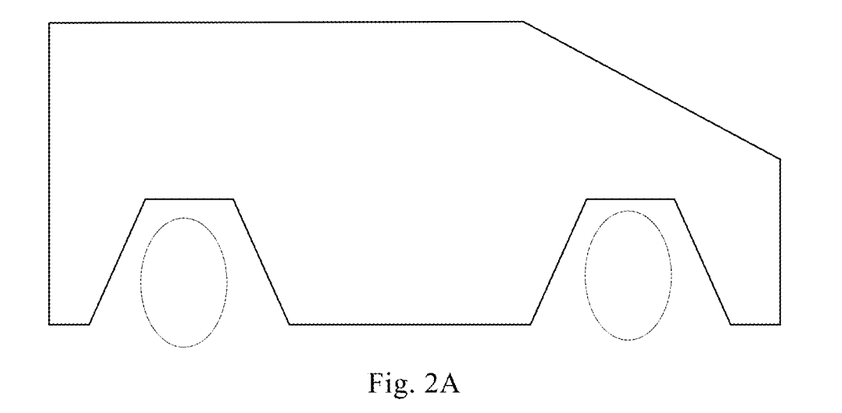
FIGS. 2A-2C show schematic views of examples of correcting an entire scanned image based on one deformation parameter according to some embodiments of the present disclosure.
Figure 2B:
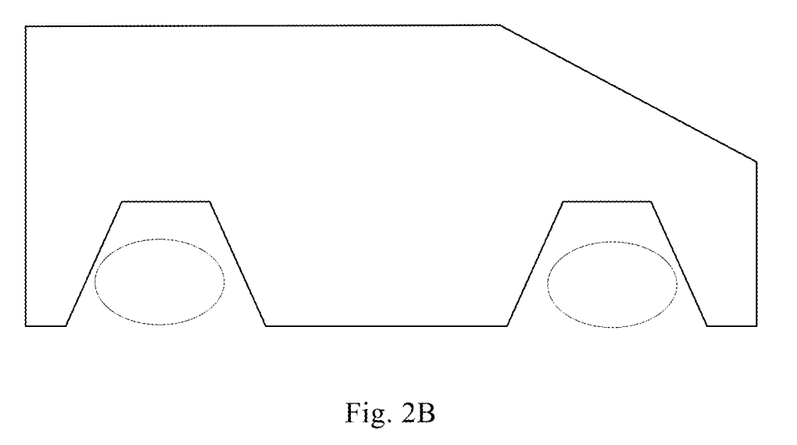
Figure 2C:
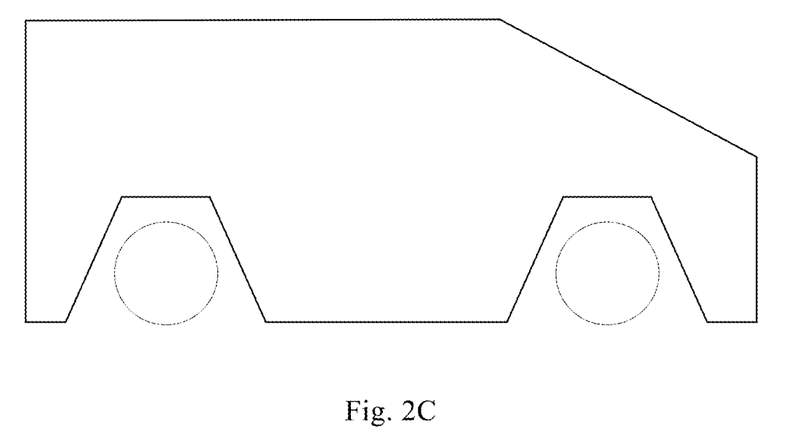

The above-described correction methods 1-2 are similar in that the entire scanned image is corrected based on one deformation parameter, and this correction method is described in conjunction with FIGS. 2A-2C. In one embodiment, the one deformation parameter may be a deformation parameter of one reference object (corresponding to the correction method 1), or the same deformation parameter of reference objects (corresponding to the correction method 2).

Taking vehicle detection as an example, a round wheel is set as a reference object. The standard parameter of the vehicle reference object is that the ratio of the vertical radius to the horizontal radius is 1:1.

As shown in FIG. 2A, two wheel-reference objects are detected from the scanned image of the vehicle. Compared with the round standard parameter of the wheel-reference object, the detected two wheel-reference objects are both deformed, and the deformation parameter (which may indicate the degree of deformation) are the same. Supposing that the deformation parameters of the detected two wheel-reference objects both have a ratio of the vertical radius to the horizontal radius of 2:1, it means that the scanned image of the vehicle is stretched in the vertical direction. (1) According to the degree of stretching in the vertical direction (2 times), the scanned image of the vehicle is performed the pixel interpolation processing with a corresponding correction degree in the horizontal direction, for example the nearest pixel interpolation with an enlargement factor of 2. That is, one pixel is inserted between every two horizontal pixels, and the characteristic value of the inserted pixel is, for example, an average value of the characteristic values of the two nearest horizontal pixels on the left and right sides of the inserted pixel. (2) According to the degree of stretching in the vertical direction (2 times), the scanned image of the vehicle is performed the pixel sampling processing with a corresponding correction degree in the vertical direction, for example, equal interval pixel sampling with a reduction factor of 1/2. That is, one vertical pixel is sampled in every two vertical pixels as a corrected vertical pixel of the scanned image. (3) According to the degree of stretching in the vertical direction (2 times), the scanned image of the vehicle is performed the pixel interpolation processing with a corresponding correction degree in the horizontal direction and the pixel sampling processing with a corresponding correction degree in the vertical direction. For example, the nearest pixel interpolation with an enlargement factor of 1.5 in the horizontal direction and the equal interval pixel sampling with a reduction factor of 3/4 in the vertical direction are performed at the same time. That is, one horizontal pixel is added based on every two horizontal pixels in the horizontal direction. For example, the horizontal pixel 12 is added based on the horizontal pixel 1 and the horizontal pixel 2 (the characteristic value of the horizontal pixel 12 is determined based on the characteristic value of the horizontal pixel 1 and the characteristic value of the horizontal pixel 2, for example, an average value of the characteristic value of the horizontal pixel 1 and the characteristic value of the horizontal pixel 2 is determined as a characteristic value of the horizontal pixel 12); the horizontal pixel 34 is added based on the horizontal pixel 3 and the horizontal pixel 4 (the characteristic value of the horizontal pixel 34 is determined based on the characteristic value of the horizontal pixel 3 and the characteristic value of the horizontal pixel 4), and so forth. In the vertical direction, three vertical pixels are sampled for every four vertical pixels as corrected vertical pixels of the scanned image. By means of the above-described processes of (1), (2) or (3), the deformed scanned image of the vehicle shown in FIG. 2A may be corrected to the scanned image of the vehicle shown in FIG. 2C. In FIG. 2C, the ratio of the vertical radius to the horizontal radius of the wheel-reference object is 1:1, which conforms to the setting of the standard parameter of the wheel-reference object.

As shown in FIG. 2B, two wheel-reference objects are detected from the scanned image of the vehicle. Compared with the round standard parameter of the wheel-reference object, the detected two wheel-reference objects are both deformed, and the deformation parameter (which may indicate the degree of deformation) are the same. Supposing that the deformation parameters of the detected two wheel-reference objects both have a ratio of the vertical radius to the horizontal radius of 1:2, it means that the scanned image of the vehicle is stretched in the horizontal direction. (1) According to the degree of stretching in the horizontal direction (2 times), the scanned image of the vehicle is performed the pixel interpolation processing with a corresponding correction degree in the vertical direction, for example the nearest pixel interpolation with an enlargement factor of 2. That is, one pixel is inserted between every two vertical pixels, and the characteristic value of the inserted pixel is, for example, an average value of the characteristic values of the two nearest vertical pixels on the upper and lower sides of the inserted pixel. (2) According to the degree of stretching in the horizontal direction (2 times), the scanned image of the vehicle is performed the pixel sampling processing with a corresponding correction degree in the horizontal direction, for example, equal interval pixel sampling with a reduction factor of 1/2. That is, one horizontal pixel is sampled in every two horizontal pixels as a corrected horizontal pixel of the scanned image. (3) According to the degree of stretching in the horizontal direction (2 times), the scanned image of the vehicle is performed the pixel interpolation processing with a corresponding correction degree in the vertical direction and the pixel sampling processing with a corresponding correction degree in the horizontal direction, for example, the nearest pixel interpolation with an enlargement factor of 1.5 in the vertical direction and the equal interval pixel sampling with a reduction factor of 3/4 in the horizontal direction are performed at the same time. That is, one vertical pixel is added based on every two vertical pixels in the vertical direction. For example, the vertical pixel 12 is added based on the vertical pixel 1 and the vertical pixel 2 (the characteristic value of the vertical pixel 12 is determined based on the characteristic value of the vertical pixel 1 and the characteristic value of the vertical pixel 2, for example, an average value of the characteristic value of the vertical pixel 1 and the characteristic value of the vertical pixel 2 is determined as a characteristic value of the vertical pixel 12), the vertical pixel 34 is added based on the vertical pixel 3 and the vertical pixel 4 (the characteristic value of the vertical pixel 34 is determined based on the characteristic value of the vertical pixel 3 and the characteristic value of the vertical pixel 4), and so forth. In the horizontal direction, three horizontal pixels are sampled for every four horizontal pixels as corrected horizontal pixels of the scanned image. By means of the above-described processes of (1), (2) or (3), the deformed scanned image of the vehicle shown in FIG. 2B may be corrected to the scanned image of the vehicle shown in FIG. 2C. In FIG. 2C, the ratio of the vertical radius to the horizontal radius of the wheel-reference object is 1:1, which conforms to the setting of the standard parameter of the wheel-reference object.

The first implementation method of the correction method 3 includes: in response that reference objects are detected from the scanned image and the plurality of reference objects have different deformation parameters, dividing the scanned image into parts with the same number of the reference objects and dividing different reference objects at different parts of the scanned image based on positions and the number of the reference objects; and correcting the image of the part where each reference object is situated in the scanned image respectively based on the deformation parameter of the corresponding reference object.

Figure 3A:
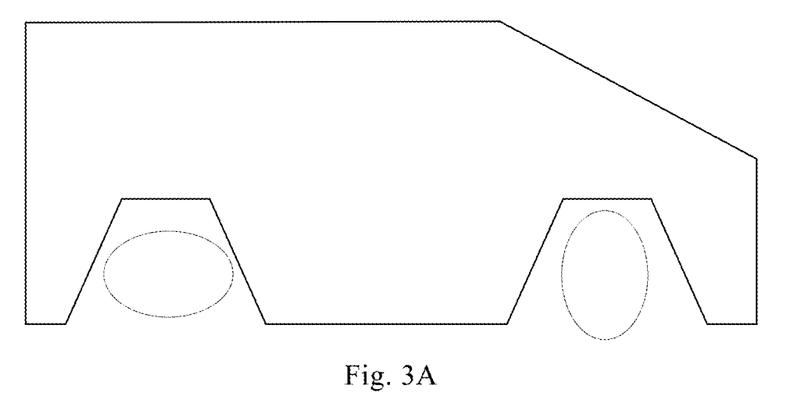
FIGS. 3A-3E show schematic views of examples of respectively correcting images of different parts of a scanned image based on deformation parameter according to some embodiments of the present disclosure.

Taking the vehicle detection as an example, a round wheel is set as a reference object. The standard parameter of the wheel-reference object is that the ratio of the vertical radius to the horizontal radius is 1:1.

As shown in FIG. 3A, two wheel-reference objects are detected from the scanned image of the vehicle. Compared with the round standard parameter of the wheel-reference object, the detected two wheel-reference objects are both deformed, and the deformation parameters (which may indicate the degree of deformation) are different, which results from the uneven speed of the vehicle. For example, during the scanning process, the vehicle speed first increases and then decreases, and the deformation shown in FIG. 3A is prone to appear. Suppose that the deformation parameter of the front wheel-reference object is that the ratio of the vertical radius to the horizontal radius is 2:1, and the deformation parameter of the rear wheel-reference object is that the ratio of the vertical radius to the horizontal radius is 1:2.

Figure 3B:
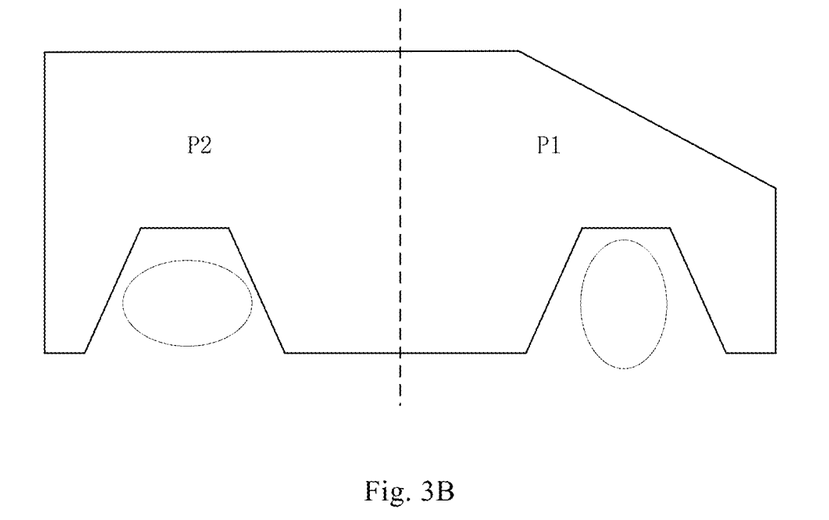

As shown in FIG. 3B, the scanned image of the vehicle is divided into two parts P1 and P2 based on the positions and numbers of the wheel-reference objects. The front wheel-reference object is divided at the part P1, and the rear wheel-reference object is divided at the part P2. The part P1 of the scanned image is corrected based on the deformation parameter of the front wheel-reference object; at the same time, the part P2 of the scanned image is corrected based on the deformation parameter of the rear wheel-reference object. For the specific correction method of each part of the scanned image based on the deformation parameter of this part, reference may be made to the relevant description of the embodiments shown in FIGS. 2A-2C, which will not be described in detail here.

Figure 3C:
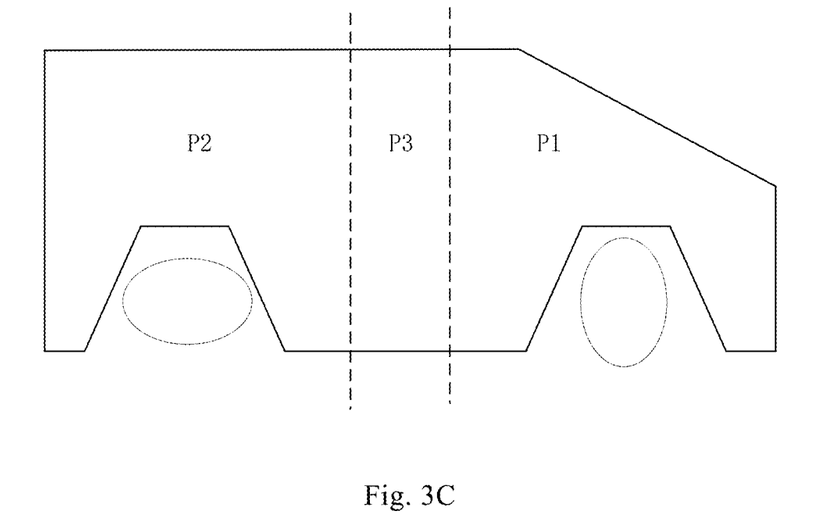
Figure 3D:
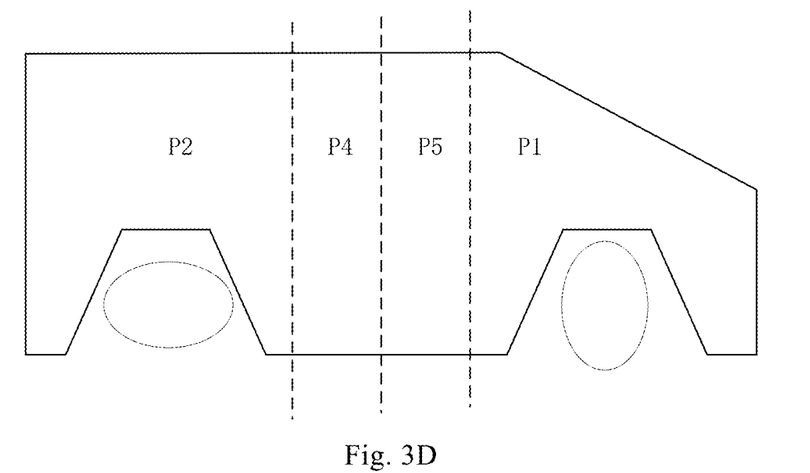
Figure 3E:
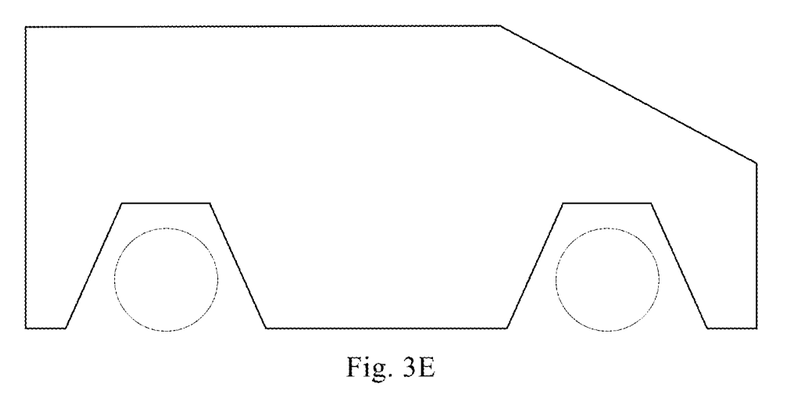

The deformed scanned image of the vehicle shown in FIG. 3A is corrected as shown in FIG. 3B to obtain the scanned image of the vehicle shown in FIG. 3E. In FIG. 3E, the ratio of the vertical radius to the horizontal radius of the wheel-reference object is 1:1, which conforms to the setting of the standard parameter of the wheel-reference object.

The second implementation method of the correction method 3 includes: in response that reference objects are detected from the scanned image and the plurality of reference objects have different deformation parameters, providing one or more transition areas between two adjacent reference objects in the scanned image, and deformation parameter of each transition area is determined based on the deformation parameters of the two adjacent reference objects; dividing the scanned image into parts where each reference object is situated and one or more transition areas between the two adjacent reference objects; correcting the image of the part where each reference object is situated in the scanned image respectively based on the deformation parameter of the corresponding reference object; and correcting the image of each transition area respectively based on the deformation parameter of the corresponding transition area. In one embodiment, the deformation parameter of each transition area between the two adjacent reference objects are obtained by weighted summing the deformation parameters of the two adjacent reference objects according to the corresponding weighting factors, and the more proximate to the transition area, the greater weighting factor of the reference object.

Still taking the deformed scanned image of the vehicle shown in FIG. 3A as an example, the detected two wheel-reference objects are deformed, and the deformation parameters (which may indicate the degree of deformation) are different. Suppose that the deformation parameter of the front wheel-reference object is that the ratio of the vertical radius to the horizontal radius is 2:1, and the deformation parameter of the rear wheel-reference object is that the ratio of the vertical radius to the horizontal radius is 1:2.

As shown in FIG. 3C, the scanned image of the vehicle is divided into a part P1 where the front wheel-reference object is located, a part P2 where the rear wheel-reference object is located, and a transition area P3 between the front wheel-reference object and the rear wheel-reference object. The part P1 of the scanned image is corrected based on the deformation parameter of the front wheel-reference object; at the same time, the part P2 of the scanned image is corrected based on the deformation parameter of the rear wheel-reference object; at the same time, the image of the transition area P3 is corrected based on the deformation parameter of the transition area P3. In one embodiment, the deformation parameter of the transition area P3 is obtained by weighted summing the deformation parameter of the front wheel-reference object and the deformation parameter of the rear wheel-reference object. Since the transition area P3 is at the same distance from the front wheel-reference object as from the rear wheel-reference object, the weighting factors of the deformation parameter of the wheel-reference object and the rear wheel-reference object are the same, for example, both 1/2. For the specific correction method of each part of the scanned image based on the deformation parameter of this part, reference may be made to the relevant description of the embodiments shown in FIGS. 2A-2C, which will not be described in detail here.

As shown in FIG. 3D, the scanned image of the vehicle is divided into a part P1 where the front wheel-reference object is located, a part P2 where the rear wheel-reference object is located, and two transition areas P4 and P5 between the front wheel-reference object and the rear wheel-reference object. The part P1 of the scanned image is corrected based on the deformation parameter of the front wheel-reference object; at the same time, the part P2 of the scanned image is corrected based on the deformation parameter of the rear wheel-reference object; at the same time, the image of the transition area P4 is corrected based on the deformation parameter of the transition area P4; at the same time, the image of the transition area P5 is corrected based on the deformation parameter of the transition area P5. In one embodiment, the deformation parameters of the transition areas P4 and P5 may both be obtained by weighted summing the deformation parameter of the front wheel-reference object and the deformation parameter of the rear wheel-reference object. Since the transition area P4 is more proximate to the part P2, when the deformation parameter of the transition area P4 is calculated, the deformation parameter of the rear wheel-reference object have a greater weighing factor than the deformation parameter of the front wheel-reference object. For example, the weighting factor of deformation parameter of the rear wheel-reference object is 2/3, and the weighting factor of deformation parameter of the front wheel-reference object is 1/3. Since the transition area P5 is more proximate to the part P1, when the deformation parameter of the transition area P5 is calculated, the deformation parameter of the front wheel-reference object have a greater weighing factor than the deformation parameter of the rear wheel-reference object. For example, the weighting factor of deformation parameter of the front wheel-reference object is 2/3, and the weighting factor of deformation parameter of the rear wheel-reference object is 1/3. For the specific correction method of each part of the scanned image based on the deformation parameter of this part, reference may be made to the relevant description of the embodiments shown in FIGS. 2A-2C, which will not be described in detail here.

By adding a transition area between adjacent deformed parts, and correcting the scanned image of the transition area based on the deformation parameter of the transition area, it is possible to allow a better overall smoothness of the corrected scanned image, further improve the problem of image deformation and further improve the detection effect. The greater the number of transition areas, the better the overall smoothness of the corrected scanned image.

Figure 4:
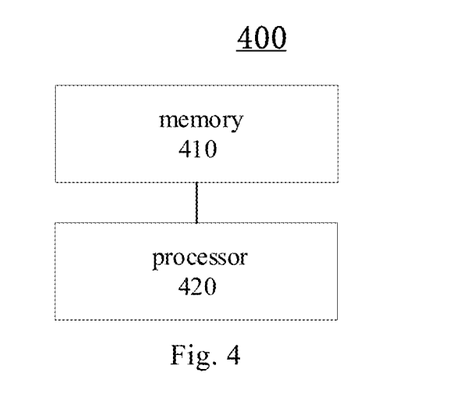
FIG. 4 shows a schematic view of a device for correcting a scanned image according to some embodiments of the present disclosure.

FIG. 4 shows a schematic view of a device for correcting a scanned image according to some embodiments of the present disclosure.

As shown in FIG. 4, the device 400 for correcting a scanned image in this embodiment includes: a memory 410 and a processor 420 coupled to the memory 410, and the processor 420 is configured to run instructions stored in the memory 410 to implement the method for correcting a scanned image according to any one of the embodiments.

The method for correcting a scanned image includes for example: obtaining a scanned image of a scanned object; detecting one or more reference objects from the scanned image; determining a deformation parameter of each reference object of the one or more reference objects based on preset a standard parameter of the each reference object; and correcting the scanned image based on the deformation parameters of the one or more reference objects.

The correcting the scanned image includes for example: in response that reference objects are detected from the scanned image and the plurality of reference objects have different deformation parameters, correcting images of different parts of the scanned image respectively based on the deformation parameter of each reference object, or in response that reference objects are detected from the scanned image and the plurality of reference objects have the same deformation parameter, correcting the entire scanned image based on the same deformation parameter; or in response that one reference object is detected from the scanned image, correcting the entire scanned image based on the deformation parameter of the one reference object.

The step of in response that reference objects are detected from the scanned image and the plurality of reference objects have different deformation parameters, correcting images of different parts of the scanned image respectively based on the deformation parameter of each reference object includes for example that: dividing the scanned image into parts with the same number of the reference objects and dividing different reference objects at different parts of the scanned image based on positions and the number of the reference objects; and correcting the image of the part where each reference object is situated in the scanned image respectively based on the deformation parameter of the corresponding reference object.

The step of in response that reference objects are detected from the scanned image and the plurality of reference objects have different deformation parameters, correcting images of different parts of the scanned image respectively based on the deformation parameter of each reference object includes for example that: providing one or more transition areas between two adjacent reference objects in the scanned image, and deformation parameter of each transition area is determined based on the deformation parameters of the two adjacent reference objects; dividing the scanned image into parts where each reference object is situated and one or more transition areas between the two adjacent reference objects; correcting the image of the part where each reference object is situated in the scanned image respectively based on the deformation parameter of the corresponding reference object; and correcting the image of each transition area respectively based on the deformation parameter of the corresponding transition area.

In one embodiment, the memory 410 may include, for example, a system memory, a fixed non-volatile storage medium, and the like. The system memory stores, for example, an operation system, an application program, a Boot Loader, and other programs.

Figure 5:
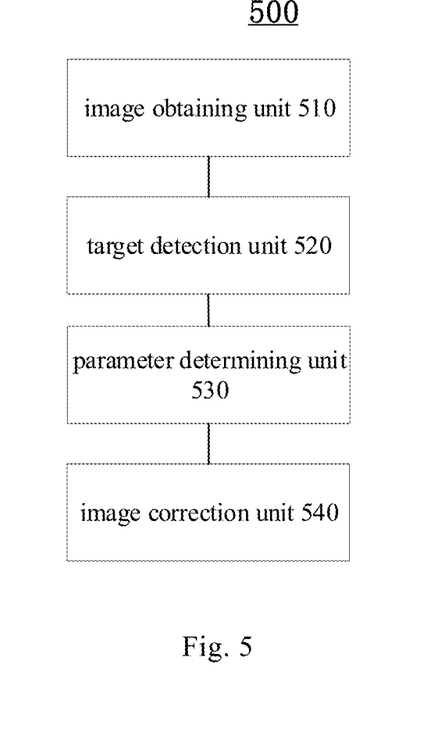
FIG. 5 shows a schematic view of a device for correcting a scanned image according to some embodiments of the present disclosure.

FIG. 5 shows a schematic view of a device for correcting a scanned image according to some embodiments of the present disclosure.

As shown in FIG. 5, the device 500 for correcting a scanned image in this embodiment includes the following devices.

The image obtaining device 510 is configured to obtain a scanned image of a scanned object.

The target detection device 520 is configured to detect one or more reference objects from the scanned image.

The parameter determining device 530 is configured to determine a deformation parameter of each reference object of the one or more reference objects based on preset a standard parameter of the each reference object.

The image correction device 540 is configured to correct the scanned image based on the deformation parameters of the one or more reference objects.

Wherein, the target detection device 520 is configured to use the reference object as a target to be detected, and detect one or more reference objects from the scanned image by using a target detection model.

In one embodiment, the image correction device 540 is configured to: in response that reference objects are detected from the scanned image and the plurality of reference objects have different deformation parameters, correcting images of different parts of the scanned image respectively based on the deformation parameter of each reference object, or in response that reference objects are detected from the scanned image and the plurality of reference objects have the same deformation parameter, correcting the entire scanned image based on the same deformation parameter; or in response that one reference object is detected from the scanned image, correcting the entire scanned image based on the deformation parameter of the one reference object.

In one embodiment, the image correction device 540 is configured to in response that reference objects are detected from the scanned image and the plurality of reference objects have different deformation parameters, dividing the scanned image into parts with the same number of the reference objects and dividing different reference objects at different parts of the scanned image based on positions and the number of the reference objects; and correcting the image of the part where each reference object is situated in the scanned image respectively based on the deformation parameter of the corresponding reference object.

In one embodiment, the image correction device 540 is configured to in response that reference objects are detected from the scanned image and the plurality of reference objects have different deformation parameter, providing one or more transition areas between two adjacent reference objects in the scanned image, and deformation parameter of each transition area is determined based on the deformation parameters of the two adjacent reference objects; dividing the scanned image into parts where each reference object is situated and one or more transition areas between the two adjacent reference objects; correcting the image of the part where each reference object is situated in the scanned image respectively based on the deformation parameter of the corresponding reference object; and correcting the image of each transition area respectively based on the deformation parameter of the corresponding transition area.

Figure 6:
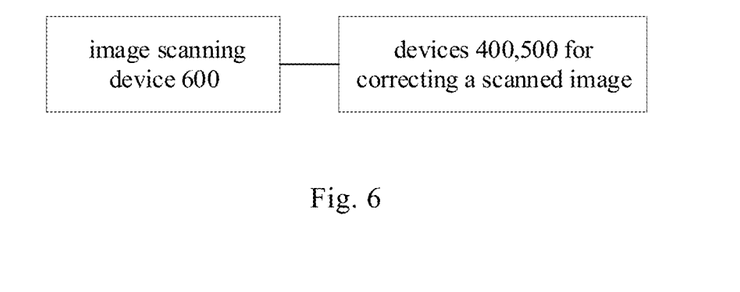
FIG. 6 shows a schematic view of an image scanning system according to some embodiments of the present disclosure.

FIG. 6 shows a schematic view of an image scanning system according to some embodiments of the present disclosure.

As shown in FIG. 6, the image scanning system of this embodiment includes: an image scanning device 600 and devices 400,500 for correcting a scanned image.

The image scanning device 600 is configured to scan a scanned object to form a scanned image of the scanned object, and transmit it to the devices 400, 500 for correcting a scanned image, to correct the scanned image.

The embodiments of the present disclosure also provide a non-transitory computer-readable storage medium storing computer programs, which when executed by a processor, implement the method for correcting a scanned image according to any one of the embodiments.

The embodiments of the present disclosure may be provided as a method, system, or computer program product. Accordingly, the present disclosure may take the form of an entirely hardware embodiment, an entirely software embodiment, or a combination of software and hardware aspects. Moreover, the present disclosure may take the form of a computer program product embodied in one or more non-transitory computer-readable storage media (including but not limited to disk memory, CD-ROM, optical memory, and the like) containing computer program codes therein.

The present disclosure is described with reference to the flow charts and/or block views of methods, devices (systems), and computer program products according to the embodiments of the present disclosure. It may be understood that each step and/or block of the flow charts and/or block views as well as a combination of steps and/or blocks of the flow charts and/or block views may be implemented by a computer program instruction. These computer program instructions may be provided to a processor of a general purpose computer, special purpose computer, an embedded processing machine, or other programmable data processing devices to produce a machine, and the instructions executed by a processor of a computer or other programmable data processing devices produce a device for realizing a function designated in one or more steps of a flow chart and/or one or more blocks in a block view.

These computer program instructions may also be stored in a computer readable memory that may guide a computer or other programmable data processing device to operate in a particular manner, and the instructions stored in the computer readable memory produce a manufacture including an instruction device. The instruction device realizes a function designated in one or more steps in a flow chart or one or more blocks in a block view.

These computer program instructions may also be loaded onto a computer or other programmable data processing devices, and a series of operational steps are performed on a computer or other programmable device to produce a computer-implemented processing, and the instructions executed on a computer or other programmable devices provide steps for realizing a function designated in one or more steps of the flow chart and/or one or more blocks in the block view.

What is claimed is:

1. A method for correcting a scanned image, comprising:
obtaining a scanned image of a scanned object;
detecting one or more reference objects from the scanned image;
determining a deformation parameter of each reference object of the one or more reference objects based on preset a standard parameter of the each reference object; and
correcting the scanned image based on the deformation parameters of the one or more reference objects comprising:

in response that a plurality of reference objects are detected from the scanned image and the plurality of reference objects have different deformations parameters, correcting images of different parts of the scanned image respectively based on the deformation parameters of each reference object; or in response that a plurality of reference objects are detected from the scanned image and the plurality of reference have the same deformation parameter, correcting the entire scanned image based on the same deformation parameter; or in response that one reference object is detected from the scanned image, correcting the entire scanned image based on the deformation parameter of the one reference object;

if the deformation parameter indicate that an image to be corrected is stretched in the vertical direction, performing, on the image to be corrected, at least one of the pixel interpolation processing in horizontal direction or the pixel sampling processing in vertical direction with a correction degree corresponding to a degree of stretching in the vertical direction; or if the deformation parameter indicate that an image to be corrected is stretched in the horizontal direction, performing, on the image to be corrected, at least one of the pixel sampling processing in horizontal direction of the pixel interpolation processing in vertical direction with a correction degree corresponding to a degree of stretching in the horizontal direction;

wherein the image to be corrected is the entire scanned image or any one of image of different parts of the scanned image.

2. The method according to claim 1, wherein in response that a plurality of reference objects are detected from the scanned image and the plurality of reference objects have different deformation parameters, correcting images of different parts of the scanned image respectively based on the deformation parameter of each reference object comprises:
dividing the scanned image into a plurality of parts with the same number of the reference objects and dividing different reference objects at different parts of the scanned image based on positions and the number of the reference objects; and
correcting the image of the part where each reference object is situated in the scanned image respectively based on the deformation parameter of the corresponding reference object.

3. The method according to claim 1, wherein in response that a plurality of reference objects are detected from the scanned image and the plurality of reference objects have different deformation parameters, correcting images of different parts of the scanned image respectively based on the deformation parameter of each reference object comprises:
providing one or more transition areas between two adjacent reference objects in the scanned image, wherein deformation parameter of each transition area is determined based on the deformation parameters of the two adjacent reference objects;
dividing the scanned image into parts where each reference object is situated and one or more transition areas between the two adjacent reference objects;
correcting the image of the part where each reference object is situated in the scanned image respectively based on the deformation parameter of the corresponding reference object; and correcting the image of each transition area respectively based on the deformation parameter of the corresponding transition area.

4. The method according to claim 3, wherein the deformation parameter of each transition area between the two adjacent reference objects are obtained by weighted summing the deformation parameters of the two adjacent reference objects according to the corresponding weighting factors, wherein the more proximate to the transition area, the greater weighting factor of the reference object.

5. The method according to claim 1, wherein the detecting one or more reference objects from the scanned image comprises:
using the reference object as a target to be detected, and detecting one or more reference objects from the scanned image by using a target detection model.

6. The method according to claim 5, wherein the target detection model comprises:
Region-based Convolutional Neural Networks (R-CNN) model, You only look once (YOLO) model, Single Shot MultiBox Detector (SSD), Weakly supervised object detection (WSOD) model, or a combination of Histogram of Oriented Gradient (HOG) and Support Vector Machine (SVM).

7. The method according to claim 1, wherein the reference object is a part of a known shape or a known dimensional ratio of the scanned object.

8. The method according to claim 7, wherein:
in response that the scanned object is a vehicle, the reference object is a round wheel of the vehicle; or
in response that the scanned object is a container, the reference object is a detection surface with a known ratio of length to width of the container.

9. The method according to claim 1, wherein the scanned image is a backscatter image or a transmission image.

10. A device for correcting a scanned image, comprising:
a memory; and
a processor coupled to the memory, wherein the processor is configured to run instructions stored in the memory, which when executed by the processor, cause the processor to:
obtain a scanned image of a scanned object;
detect one or more reference objects from the scanned image;
determine a deformation parameter of each reference object of the one or more reference objects based on preset a standard parameter of the each reference object; and
correct the scanned image based on the deformation parameters of the one or more reference objects comprising:
in response that a plurality of reference objects are detected from the scanned image and the plurality of reference objects have different deformation parameters, correcting images of different parts of the scanned image respectively based on the deformation parameter of each reference object, or
in response that a plurality of reference objects are detected from the scanned image and the plurality of reference objects have the same deformation parameter, correcting the entire scanned image based on the same deformation parameter; or
in a response that one reference object is detected from the scanned image, correcting the entire scanned image based on the deformation parameter of the one reference object;

if the deformation parameter indicate that an image to be corrected is stretched in the vertical direction, performing, on the image to be corrected, at least one of the pixel interpolation processing in horizontal direction of the degree of stretching in the vertical direction with a correction degree corresponding to a degree of stretching in the vertical direction; or
if the deformation parameter indicate that an image to be corrected is stretched in the horizontal direction, performing, on the image to be corrected, at least one of the pixel sampling processing in horizontal direction of the pixel interpolation processing in vertical direction with a correction degree corresponding to a degree of stretching in the horizontal direction;
wherein the image to be corrected is the entire scanned image or any one of image of different parts of the scanned image.

11. A device for correcting a scanned image, comprising:
an image obtaining device configured to obtain a scanned image of a scanned object;
a target detection device configured to detect one or more reference objects from the scanned image;
a parameter determining device configured to determine a deformation parameter of each reference object of the one or more reference objects based on preset a standard parameter of the each reference object; and
an image correction device configured to correct the scanned image based on the deformation parameters of the one or more reference objects,
correct the scanned image based on the deformation parameters of the one or more reference objects comprising:
in response that a plurality of reference objects are detected from the scanned image and the plurality of reference objects have different deformation parameters, correcting images of different parts of the scanned image respectively based on the deformation parameter of each reference object, or
in response that a plurality of reference objects are detected from the scanned image and the plurality of reference objects have the same deformation parameter, correcting the entire scanned image based on the same deformation parameter; or
in a response that one reference object is detected from the scanned image, correcting the entire scanned image based on the deformation parameter of the one reference object;
if the deformation parameter indicate that an image to be corrected is stretched in the vertical direction, performing, on the image to be corrected, at least one of the pixel interpolation processing in horizontal direction of the degree of stretching in the vertical direction with a correction degree corresponding to a degree of stretching in the vertical direction; or
if the deformation parameter indicate that an image to be corrected is stretched in the horizontal direction, performing, on the image to be corrected, at least one of the pixel sampling processing in horizontal direction of the pixel interpolation processing in vertical direction with a correction degree corresponding to a degree of stretching in the horizontal direction;
wherein the image to be corrected is the entire scanned image or any one of image of different parts of the scanned image.

12. An image scanning system, comprising:
an image scanning device configured to scan a scanned object to form a scanned image of the scanned object; and
the device for correcting a scanned image according to claim 10.

13. The image scanning system according to claim 12, wherein the image scanning device is a backscatter image scanning device or a transmission image scanning device.

14. A non-transitory computer-readable storage medium storing computer programs, which when executed by a processor, implement the method for correcting a scanned image according to claim 1.

15. The device according to claim 10, wherein the processor is configured to run instructions stored in the memory to implement the method for correcting a scanned image, wherein in response that a plurality of reference objects are detected from the scanned image and the plurality of reference objects have different deformation parameters, correcting images of different parts of the scanned image respectively based on the deformation parameter of each reference object comprises:
dividing the scanned image into a plurality of parts with the same number of the reference objects and dividing different reference objects at different parts of the scanned image based on positions and the number of the reference objects; and
correcting the image of the part where each reference object is situated in the scanned image respectively based on the deformation parameter of the corresponding reference object.

16. The device according to claim 10, wherein the processor is configured to run instructions stored in the memory to implement the method for correcting a scanned image, wherein in response that a plurality of reference objects are detected from the scanned image and the plurality of reference objects have different deformation parameters, correcting images of different parts of the scanned image respectively based on the deformation parameter of each reference object comprises:
providing one or more transition areas between two adjacent reference objects in the scanned image, wherein deformation parameter of each transition area is determined based on the deformation parameters of the two adjacent reference objects;
dividing the scanned image into parts where each reference object is situated and one or more transition areas between the two adjacent reference objects;
correcting the image of the part where each reference object is situated in the scanned image respectively based on the deformation parameter of the corresponding reference object; and
correcting the image of each transition area respectively based on the deformation parameter of the corresponding transition area.

\* \* \* \* \*